(12) United States Patent
Iimura

(10) Patent No.: US 9,116,362 B2
(45) Date of Patent: Aug. 25, 2015

(54) EYEGLASS FRAME

(71) Applicant: FOUR NINES CO., LTD., Tokyo (JP)

(72) Inventor: Yuichi Iimura, Tokyo (JP)

(73) Assignee: Four Nines Co., Ltd., Tokyo (JP)

( * ) Notice: Subject to any disclaimer, the term of this patent is extended or adjusted under 35 U.S.C. 154(b) by 117 days.

(21) Appl. No.: 13/792,602

(22) Filed: Mar. 11, 2013

(65) Prior Publication Data

US 2014/0253864 A1 Sep. 11, 2014

(51) Int. Cl.
| | |
|---|---|
| *G02C 1/00* | (2006.01) |
| *G02C 5/00* | (2006.01) |
| *G02C 5/02* | (2006.01) |
| *G02C 5/16* | (2006.01) |

(52) U.S. Cl.
CPC .. *G02C 5/00* (2013.01); *G02C 1/00* (2013.01); *G02C 5/02* (2013.01); *G02C 5/16* (2013.01)

(58) Field of Classification Search
CPC .............. G02C 1/00; G02C 1/04; G02C 1/06; G02C 5/008; G02C 5/14; G02C 5/146; G02C 5/16; G02C 5/00; G02C 5/001
USPC ............. 351/83, 89, 103–109, 47, 48, 57, 58, 351/124–135
See application file for complete search history.

(56) References Cited

U.S. PATENT DOCUMENTS

| | | | | |
|---|---|---|---|---|
| 4,632,526 | A * | 12/1986 | Lhospice | ...................... 351/124 |
| 7,722,188 | B2 | 5/2010 | Mikame | |
| 8,042,937 | B2 | 10/2011 | Iimura | |
| 2002/0057415 | A1 | 5/2002 | Xiao | |
| 2006/0290880 | A1 * | 12/2006 | Yu | ................................... 351/41 |
| 2009/0251659 | A1 * | 10/2009 | Mikame | ....................... 351/140 |

FOREIGN PATENT DOCUMENTS

| | | | |
|---|---|---|---|
| DE | 94 13 073 | 10/1994 | |
| EP | 0 992 830 A1 * | 4/2000 | .............. G02C 3/00 |
| EP | 2 107 415 | 10/2009 | |
| EP | 2 302 440 | 3/2011 | |
| FR | 59 177 | 5/1954 | |
| FR | 2 544 087 | 10/1984 | |
| GB | 730208 | * 5/1955 | .............. G02C 1/04 |
| GB | 1050017 | 12/1966 | |
| GB | 2485174 | 5/2012 | |
| JP | 10-26743 | 1/1998 | |
| JP | 2007-156302 | 6/2007 | |
| JP | 2007-206360 | 8/2007 | |
| JP | 2007-334219 | 12/2007 | |
| JP | 2008-76743 | 4/2008 | |
| JP | 2012-123408 | 6/2012 | |
| WO | 03/040809 | 5/2003 | |

OTHER PUBLICATIONS

European Search Report issued Jul. 2, 2013 in corresponding European Patent Application No. EP 13 15 8644.
European Search Report (ESR) issued Jul. 2, 2013 in corresponding European Patent Application No. EP 13 15 8662.0.
European Search Report issued Jul. 2, 2013 in corresponding European Patent Application No. EP 13 15 8662.0.

* cited by examiner

*Primary Examiner* — Huy K Mai
(74) *Attorney, Agent, or Firm* — Wenderoth, Lind & Ponack, L.L.P.

(57) ABSTRACT

An eyeglass frame includes an outer frame (20), an inner frame (50) provided with a pair of eyeglass lenses (60), and temples (31) connected to the outer frame (20). The inner frame (50) is attached to the outer frame (20) through connection members (55).

9 Claims, 6 Drawing Sheets

EYEGLASS FRAME

BACKGROUND OF THE INVENTION

1. Field of the Invention

The present invention relates to an eyeglass frame for holding eyeglass lenses, more specifically to an eyeglass frame in that, even if temples are opened widely, deformation or breaking of the eyeglass lenses is not generated.

2. Description of the Related Art

Generally, an eyeglass frame includes a front frame to hold right and left eyeglass lenses and temples connected to each of opposite ends of the front frame through a hinge. As such a front frame, there are a full rim type (a type for holding each lens by a rim extending throughout the entirety of the lens) and a rimless type called a half rim type or two points (a type for holding a part of each lens by a rim and for holding the other part of the lens by a screw, wire or string).

When a user uses usually the eyeglass frame, the temples are in a most opened state (maximum open state or position) relative to the front frame. On the other hand, when a user buys an eyeglass frame, an open degree of the hinge connecting the front frame and each of the temples, or a bending degree of the temples is adjusted such that the temples do not impart a large force to a head of the user, and the temples are fitted to the head.

However, when the user mounts the eyeglasses on the head, or removes them from the head, the user tends to open unconsciously the temples and more widely than the maximum open state. Therefore, if the eyeglass frame is used throughout a long period, the temples result in outwardly bent state and gradually are not fitted to the head, and hence the eyeglasses cannot be used. In addition, a large force is sometime added to the front frame by an excessive opening of the temples. Consequently, the breaking of the front frame, and further breaking of the eyeglass lenses are generated.

As shown in FIG. 6, there is disclosed a conventional eyeglass frame 110 in which, even if temples are opened largely, a force is not imparted to a front frame or eyeglass lenses (for reference, see JP2008-76743A). The eyeglass frame 110 has a generally L-character like shape and includes a pair of right and left lens stays 122 each holding an inner side portion of an eyeglass lens 160, a bridge 123 connecting the pair of lens stays 122, a connection arm 124 connected to each of the lens stays 122, and a temple 131 connected to each of the connection arms 124 through a hinge 130 to be rotatable inwardly and outwardly. Meanwhile, lens stoppers 162 to hold the eyeglass lenses 160 are provided on the lens stays 122.

Here, each of the eyeglass lenses 160 is attached to each of the lens stays 122 at one point. Therefore, even if the temples 131 are opened widely, a force is not almost imparted to the eyeglass lenses 160.

In addition, because the temples 131 and the connection arms 124 have elasticity, even if the temples are opened widely repeat, the opening operation or movement can be absorbed by the elasticity of the temples 131 and the connection arms 124, and has no effect on the lenses 160. Meanwhile, reference number 161 shows a nose pad attached to each of the lens stays 122.

However, the structure of the conventional eyeglass frame cannot be applied to a full rim-type front frame made of a resin, because a design and a structure of eyeglasses are limited. Accordingly, it is desired that a function having no effect on eyeglass lenses can be applied widely to eyeglasses having other design or structure, even if a wide opening of the temples is performed repeatedly.

SUMMARY OF THE INVENTION

An object of the present invention is to provide an eyeglass frame An object of the present invention is to provide an eyeglass frame which has a function in which even if temples are opened widely, a force is almost not imparted to a front frame or eyeglass lenses, and is capable of having a new design and applying to any type of eyeglasses.

To accomplish the foregoing object, an eyeglass frame according to an embodiment of the present invention includes an outer frame, temples each being connected to each of opposite ends of the outer frame, an inner frame disposed inside the outer frame, and an attaching member to attach the inner frame to the outer frame.

The inner frame includes an inner front frame having right and left inner rims to hold right and left eyeglass lenses.

The attaching member includes an inner bridge connecting the right and left inner rims of the inner frame and is attached to the outer frame to fix the inner frame to the outer frame.

DETAILED DESCRIPTION OF THE PREFERRED EMBODIMENTS

Preferred embodiments of the present invention will be explained hereinafter in detail with reference to the accompanying drawings.

Figure 1A:
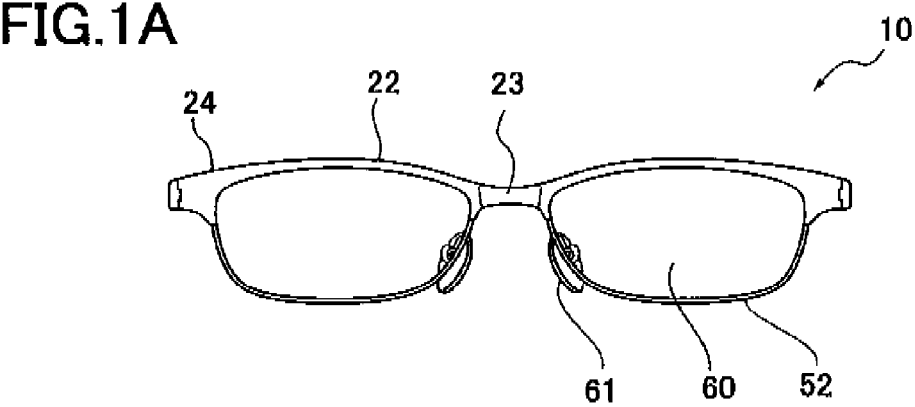
FIG. 1A is a schematic front view showing an eyeglass frame according to an embodiment of the present invention.
Figure 1B:
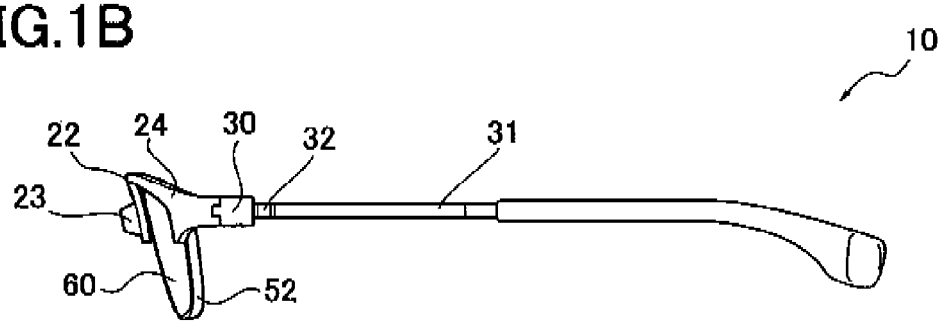
FIG. 1B is a schematic side view of the eyeglass frame shown in FIG. 1A.
Figure 1C:
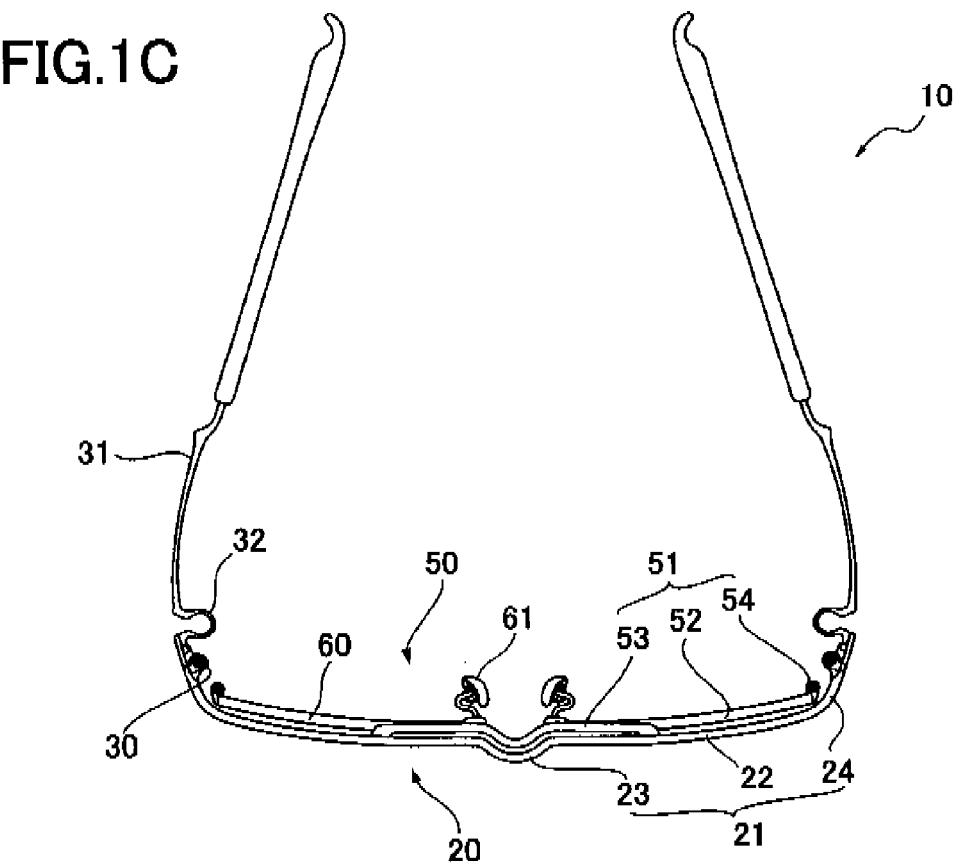
FIG. 1C is a schematic plan view of the eyeglass frame shown in FIG. 1A.
Figure 2:
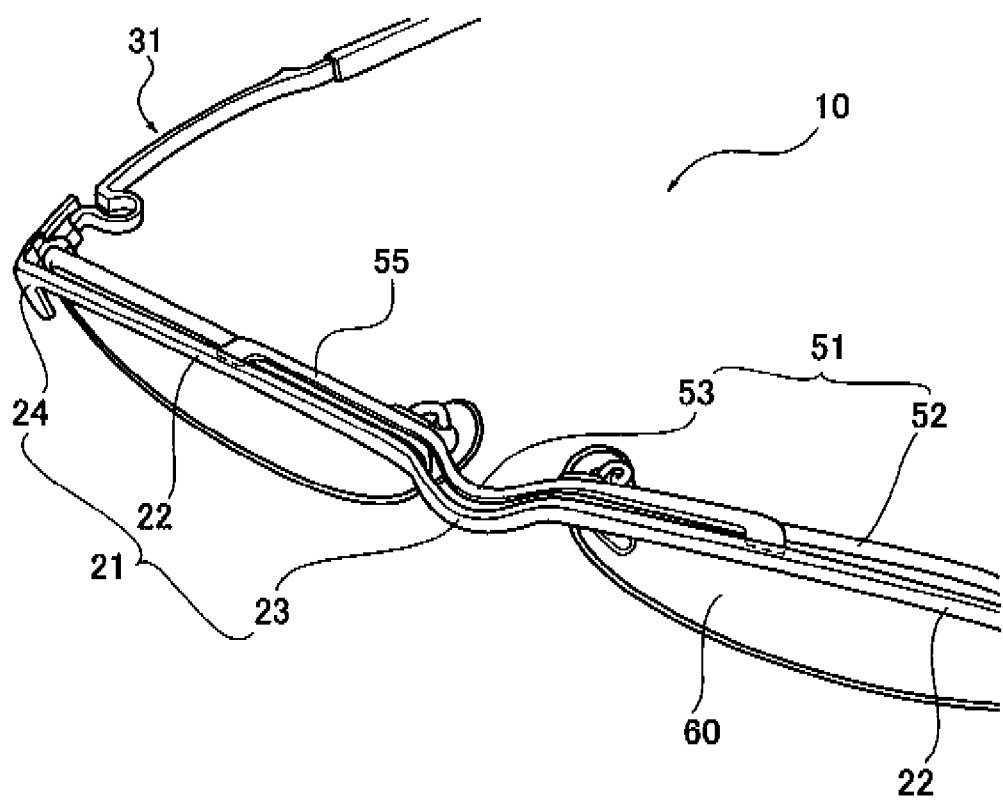
FIG. 2 is a schematic perspective view showing a front part of the eyeglass frame shown in FIGS. 1A to 1C.

FIGS. 1A to 1C and 5 illustrate an eyeglass frame 10 according to an embodiment of the present invention. The eyeglass frame 10 includes an outer frame 20, an inner frame 50 connected to the outer frame 20, and temples 31 attached to the outer frame 20, as shown in FIG. 1C.

Figure 3A:
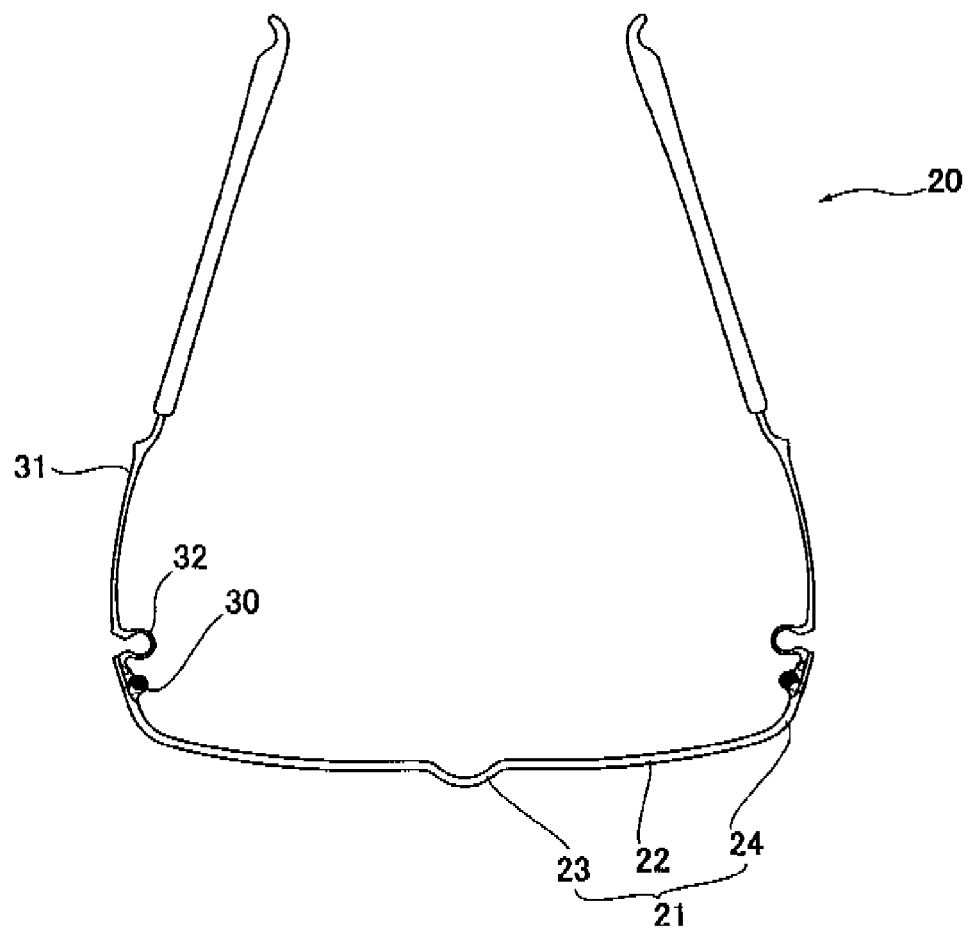
FIG. 3A is a schematic plan view of an outer frame of the eyeglass frame shown in FIGS. 1A to 1C.
Figure 3B:
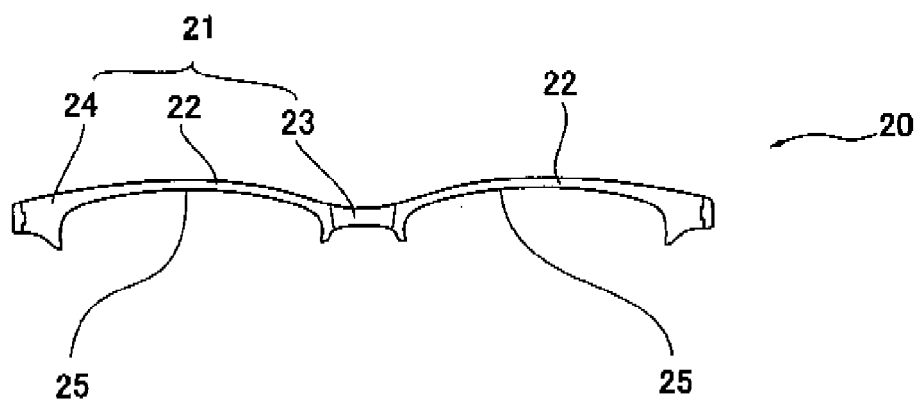
FIG. 3B is a schematic front view of the outer frame of the eyeglass frame shown in FIGS. 1A to 1C.

The outer frame 20 includes an outer front frame 21 and connection arms 24 extending backward from opposite ends of the outer front frame 21, as shown in FIGS. 3A and 3B. The outer front frame 21 has right and left outer rims 22 and an outer bridge connecting the right and left outer rims 22 (see FIG. 3B). The right and left outer rims 22 are disposed to correspond to eyeglass lenses 60 which are described below, respectively. Each of the outer rims 22 has a contour 25 along an upper edge of each of the eyeglass lenses 60 so that an object viewing through the eyeglass lenses 60 is not blocked.

Each of the temples 31 is connected to the connection arm 24 extending backward from each of the opposite ends of the outer front frame 21 through a hinge 30. In this case, the temples 31 are rotatably attached inward and outward to the outer front frame 21. Accordingly, the temples 31 can be opened outward to a maximum open position and folded inwardly.

The outer front frame 21 is made of a metal in the illustrated embodiment, but may be made of other materials, for example, a resin. In this embodiment, the outer front frame 21 is formed by a half rim type, but may be formed by a full rim type. The temples 31 is made of a metal in this embodiment, but may be made of a resin. Here, the full rim type is a type in which a rim extends throughout the entirety of each eyeglass lens to hold the lens, and the half rim type is a type in which a half rim holds a part of the eyeglass lens and a nylon string or the like holds the other part of the eyeglass lens.

Each of the hinges 30 is configured to support rotatably each of the temples 31 on the outer front frame 21 and to limit a rotation range of the temple 31. More specifically, in a use sate of the eyeglass frame 10, the temples 31 are not rotated exceeding the maximum open position, and in a non-use state, the temples can be folded inwardly to be contained in a case (not shown).

The outer frame 20 includes preferably an elastic part 32 provided at a position close to each hinge 30. Here, the position close to the hinge includes a part of the connection arm 24, a part of temple 31 and a part of the hinge 30. In this embodiment, each of the elastic parts 32 is formed by forming an end portion of the temple 31 in a U-character like shape. Meanwhile, each of the elastic parts 32 is not limited to the U-character like shape, may be formed in an S-character like shape and so on, or any shape.

Each of the elastic parts 32 is preferably deformable resiliently at an angle equal to 10 degrees or more. Thereby, when a user mounts the eyeglass frame 10 on a head, or removes it from the head, it is possible to open further the temples 31 exceeding the maximum open position by about 10 degrees or more at one side. Consequently, it is possible to prevent the eyeglass lenses 60 from being broken.

Figure 4A:
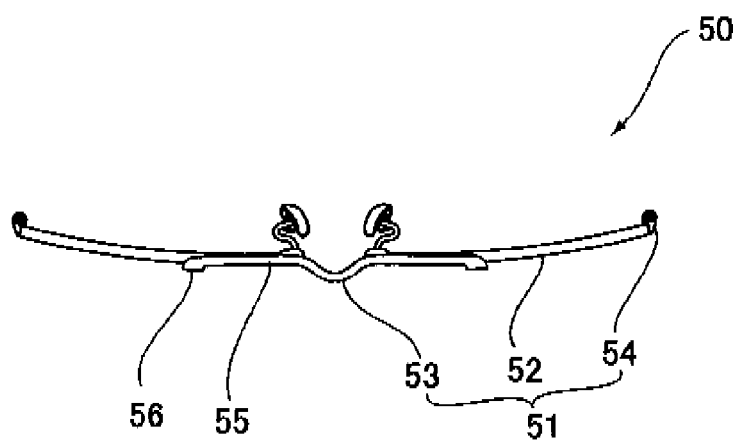
FIG. 4A is a schematic plan view of an inner frame of the eyeglass frame shown in FIGS. 1A to 1C.
Figure 4B:
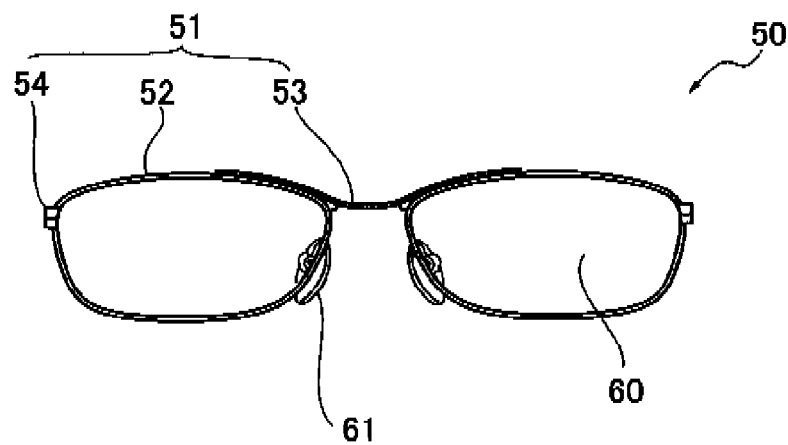
FIG. 4B is a schematic front view of the inner frame of the eyeglass frame shown in FIGS. 1A to 1C.

As shown in FIG. 4, the inner front frame 51 of the inner frame 50 is made of a metal, a pair of inner rims 52 is connected by an inner bridge 53, and a pair of eyeglass lenses is provided on the inner front frame 51. In the embodiment, the inner front frame 51 is formed in a full rim type fixing each of the eyeglass lenses 60 by a rim, but may be formed in a half rim type.

The inner frame 50 is connected to the outer frame 20 by an attaching member. The attaching member has the following structure.

Connection members 55 extend from opposite ends of the bridge 53 of the inner front frame 51. The bridge 53 connects the pair of rims 52. An end portion 56 of each of the connection members 55 is connected to the outer front frame 21. A connection of each of the rims 52 and each of the connection members 55, a connection of each of the connection members 55 and the bridge 53, and a connection of the bridge 53 and the outer front frame 21 are preferably performed by brazing. Of course, other any methods may be used. Consequently, the inner frame 50 is fixed to the outer frame 20.

Figure 5:
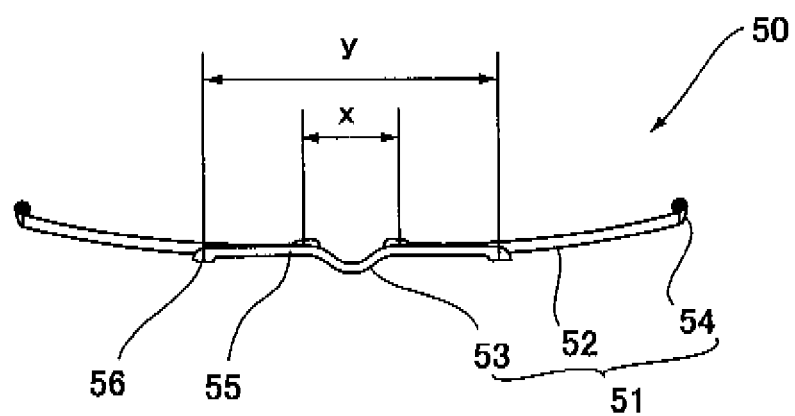
FIG. 5 is an explanatory view showing the inner frame of the eyeglass frame according to the present invention.
Figure 6:
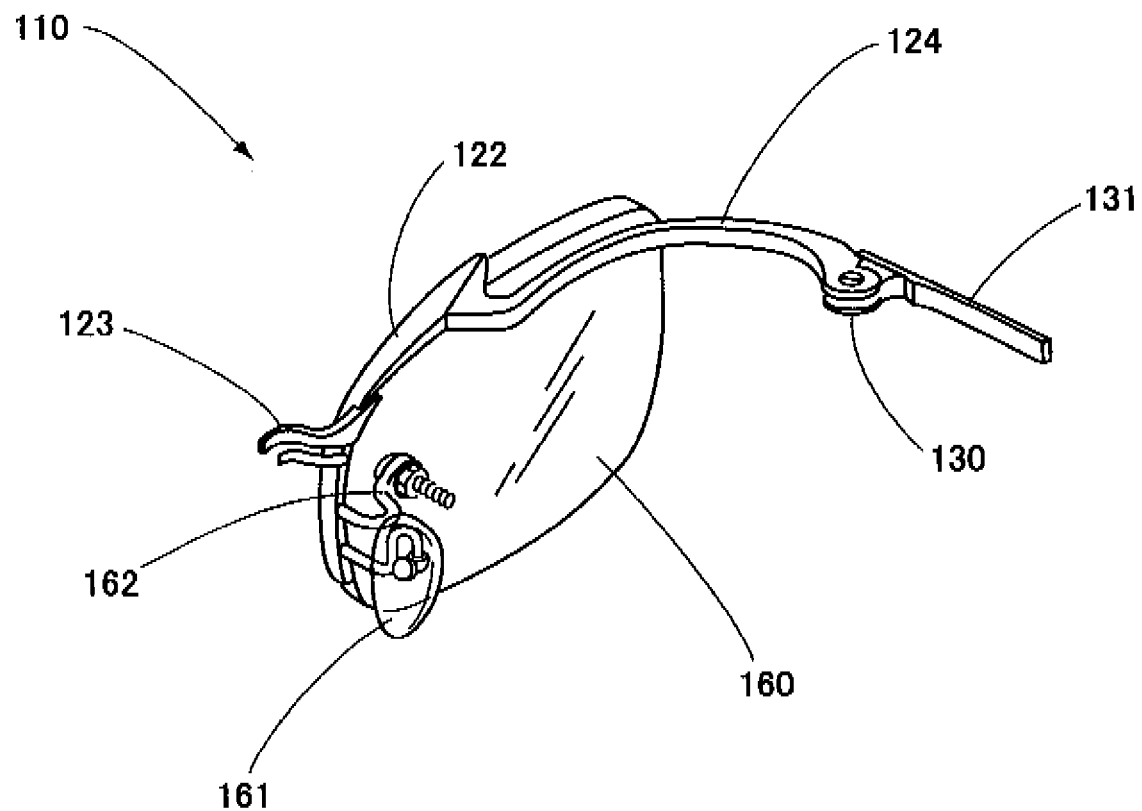
FIG. 6 is a schematic perspective view showing an example of a conventional eyeglass frame.

As shown in FIG. 5, if a distance between opposite end portions of the bridge 53 connecting the rims is x, and a distance between the end portions 56 of the connection members 55 is y, a relationship of x and y is set preferably. That is to say, of course, y is larger than x, but y is preferably two times or more of x, in particular preferably is a value between 2.5 and 3.0 times of x.

With such a relationship, even if the temples 31 are opened widely, any force generated thereby is almost not imparted to the eyeglass lenses 60. That is to say, the force is absorbed by the outer front frame 21 and the inner front frame 51. In addition, because the bridge 53 and each of the rims are connected by one point, the eyeglass lenses 60 have no influence of deformation or the like by the opening movement of the temples 31. Furthermore, this influence is very small by the elastic part 32 disposed adjacent to each of the hinges 30.

In addition, the outer front frame 21 can be formed in the full rim type, or the half rim type, the inner front frame 51 also can be formed in the full rim type, or the half rim type. The temples 31 can be made of a resin or metal. Consequently, a design having wide variation can be provided.

Meanwhile, in the eyeglass frame 10, an example in which the nose pads 61 are attached to the inner front frame 51 is shown. However, the nose pads may be attached to the outer front frame 21. In each of the elastic parts 32, a portion thereof adjacent to the connection arm has the U-character like shape, but a portion thereof adjacent to the temple may be formed in a U-character like shape, or a part of the connection arm 24, or a part of the temple 31 can be formed in a U-character like shape.

With the foregoing structure, it is possible to provide an eyeglass frame which has a function in which even if temples are opened widely, a force is almost not imparted to a front frame or eyeglass lenses, and is capable of having a new design and applying to any type of eyeglasses.

Although the preferred embodiments of the present invention have been described, it should be understood that the present invention is not limited to these embodiments, various modifications and changes can be made to the embodiments by those skilled in the art as long as such modifications and changes are within the scope of the present invention as defined by the Claims.

What is claimed is:

1. An eyeglass frame, comprising:
an outer frame;
temples connected to opposite ends of the outer frame, respectively;
an inner frame disposed inside the outer frame; and
an attaching member to attach the inner frame to the outer frame,
the inner frame including an inner front frame having right and left inner rims to hold right and left eyeglass lenses, respectively,
the attaching member including an inner bridge connecting the right and left inner rims of the inner frame, and the attaching member being attached to the outer frame to fix the inner frame to the outer frame via connection members, the connection members being extended from opposite ends of the inner bridge, respectively,
wherein the outer frame includes an outer front frame having right and left outer rims and an outer bridge connecting the right and left outer rims, and connection arms extending backward from opposite ends of the outer front frame, respectively,
and wherein each of the right and left outer rims has a contour along an upper edge of a corresponding one of the right and left eyeglass lenses attached to the inner frame.

2. The eyeglass frame according to claim 1, wherein the inner frame further includes a nose pad provided on each of the right and left inner rims of the inner front frame.

3. The eyeglass frame according to claim 1, wherein the inner frame is made of a metal.

4. The eyeglass frame according to claim 1, wherein the inner front frame is a full rim type.

5. The eyeglass frame according to claim 1, wherein the outer frame is made of a metal.

6. The eyeglass frame according to claim 1, wherein the outer front frame is a half rim type.

7. The eyeglass frame according to claim 1, wherein the temples are connected to the respective opposite ends of the outer frame through respective hinges.

8. The eyeglass frame according to claim 7, wherein the outer frame includes elastic parts provided close to the hinges, respectively, and the temples are connected to the outer frame through the respective hinges and the respective elastic parts.

9. The eyeglass frame according to claim 1, wherein a distance between respective end portions of the connection members is two times or more larger than a distance between opposite end portions of the inner bridge connecting the inner rims.

* * * * *